United States Patent Office 3,470,109
Patented Sept. 30, 1969

3,470,109
METHOD OF MAKING RECONSTITUTABLE ALOE GEL IN CRYSTALLINE FORM
Joseph R. Marsh, Jr., Fort Lauderdale, Fla., assignor to Aloe Creme Laboratories, Inc., Fort Lauderdale, Fla., a corporation of Florida
No Drawing. Filed Jan. 31, 1968, Ser. No. 701,861
Int. Cl. B01j *13/00;* C08b *19/00*
U.S. Cl. 252—316　　　　　　　　　　　　　　2 Claims

ABSTRACT OF THE DISCLOSURE

The method of making reconstitutable aloe gel and particularly aloe vera gel in dry crystalline form in which the gel is removed from the leaves, mercerized, screened, frozen to between 0° C. and −120° C., and while frozen having a vacuum administered thereto for a period of 6 to 12 hours, until anhydrous crystals remain, and storing the dry crystals in sealed containers. Later, by the addition of water, the crystals may be reconstituted into gel having the same physical and chemical properties as the fresh gel.

---

Aloe and particularly aloe vera gel in the form of dry crystals obtained from lyophilized, mercerized, screened aloe gel, said dry crystals adapted upon the addition of water, preferably deionized or distilled water, to form reconstituted gel having the same physical and chemical properties of gel prior to lyophilization.

This invention relates to aloe vera gel in crystalline form adapted to be reconstituted, with its original physical properties, and chemical properties, and method of taking fresh aloe vera gel and making it into aloe vera gel in crystalline form.

Heretofore, when it was desired to use the gel of the aloe vera plant in the manufacture of pharmaceutical preparations, cosmetics and toiletries, the leaves of the aloe vera plant were shipped to the manufacturer. This manufacturer was usually hundreds of miles from the place where the plant was grown and involved the labor, time and expense of packaging and shipping these heavy leaves, and the risk of protecting the leaves from injury and temperature in transit. There was also the need to obtain leaves of the same size and gel content.

It is among the objects of my invention to solve these problems by providing a method, operable at the place where the aloe vera plants are grown, or at the place of manufacture of pharmaceutical preparations, cosmetics and/or toiletries to remove the gel from the aloe vera leaves and freeze the same and while frozen, dry the gel under vacuum to obtain anhydrous aloe vera gel in crystalline form. With the water so withdrawn by my method from the aloe gel, most of the weight has been removed, so that the resultant aloe vera gel in crystalline form is a tiny fraction of the weight of the aloe vera gel in its original form. Thus, a saving in time, labor, leaf spoilage and damage has been accomplished.

Another object of my invention is that my aloe vera gel in dry crystalline form may be stored in sealed container and shipped at a fraction of the cost of shipping aloe vera leaves, or even aloe vera gel in its original form.

Still another object of my invention is that my resultant aloe vera gel in crystalline form may, by the addition of water, preferably deionized or distilled water, be reconstituted, with the same physical properties and chemical properties as the aloe vera gel in its original form. By the amount of the water added to the aloe vera gel in crystalline form, the viscosity and other characteristics of the reconstituted aloe vera gel may be controlled.

My invention also has such other objects, advantages and capabilities as will later more fully appear and which are inherently possessed by this invention.

While I refer in this application to a preferred embodiment of my invention, yet it is to be understood that the same is susceptible of modification and change without departing from the spirit of my invention. While I prefer to use the gel of the aloe vera plant, yet my invention includes those other species of the aloe plant which contain gel that have substantially the same physical and chemical properties as the aloe vera.

The method selected to illustrate my invention comprises the taking of leaves of the aloe vera plant and stripping off the outer skin to obtain the gel from the interior of said leaves. This gel is placed in a blender or mixer, and is mercerized from 3 to 5 minutes. The gel is then put through a suitable screen or filter. I preferably use a 60 mesh stainless steel mesh screen. The screened and filtered gel is then placed in containers within a freezing machine and the temperature brought down by the freezing machine or Dry Ice, or solid $CO_2$ and an organic solvent, to between 0° C. and −120° C. After the freezing step, a vacuum is administered to the frozen gel in the containers, during a period of 6 to 12 hours, until anhydrous crystals of the aloe vera gel remain. The said aloe vera gel in crystalline form is then removed from the containers for prompt use in pharmaceutical preparations, cosmetics and/or toiletries, or is placed in sealed containers for storage and/or shipment, for later said use.

It is apparent that the resultant crystalline aloe vera gel takes up a tiny fraction of the space of the aloe vera leaves or aloe vera gel from which it is obtained, so that the saving of space, and weight in storage and shipment of the crystalline gel in sealed containers is amazing. In addition, problems of deterioration and loss of leaves by bruising and/or temperature in transit and storage are avoided.

Upon immediate use of the aloe vera gel in crystalline form or its removal from the sealed containers, water, preferably deionized or distilled water, is added to the aloe vera gel in crystalline form, to obtain reconstituted aloe vera gel, having the same form, physical properties and chemical properties of the aloe vera gel before it was lyophilized. By the amount of water added, the viscosity and other features of the aloe vera gel may be controlled. The dry crystalline aloe vera gel can also be shipped to all parts of the world for manufacturing of pharmaceutical preparations, cosmetics and/or toiletries.

Having thus described my invention, I claim:

1. The method of making reconstitutable aloe gel in crystalline form, comprising removing the gel from the leaves of an aloe plant, mercerizing the gel in a container, screening or filtering the mercerized gel, placing the screened or filtered gel in containers within a freezing machine, freezing the gel to between 0° C. and −120° C., and administering a vacuum to the frozen gel in the containers until anhydrous crystals of the gel remain in the containers.

2. The method as set forth in claim 1, in which the gel is removed from the leaves of the aloe vera plant.

References Cited

UNITED STATES PATENTS 3,103,466　9/1963　Farkas ---------- 260—210 X

RICHARD D. LOVERING, Primary Examiner

U.S. Cl. X.R.

34—5; 424—180